United States Patent [19]

Chung

[11] Patent Number: 4,478,876

[45] Date of Patent: * Oct. 23, 1984

[54] PROCESS OF COATING A SUBSTRATE WITH AN ABRASION RESISTANT ULTRAVIOLET CURABLE COMPOSITION

[75] Inventor: Rack H. Chung, Clifton Park, N.Y.

[73] Assignee: General Electric Company, Waterford, N.Y.

[*] Notice: The portion of the term of this patent subsequent to Sep. 7, 1999 has been disclaimed.

[21] Appl. No.: 458,820

[22] Filed: Jan. 17, 1983

Related U.S. Application Data

[63] Continuation of Ser. No. 217,719, Dec. 18, 1980, abandoned.

[51] Int. Cl.$^3$ .............................................. C08F 2/50
[52] U.S. Cl. ........................... 427/54.1; 204/159.13; 428/412; 428/418; 428/447
[58] Field of Search .................... 204/159.13; 427/54.1

[56] References Cited

U.S. PATENT DOCUMENTS

| | | | |
|---|---|---|---|
| 2,592,311 | 4/1952 | Meyer et al. | 260/45.85 R |
| 2,999,835 | 9/1961 | Goldberg | 528/370 |
| 3,028,365 | 4/1962 | Schnell et al. | 528/199 |
| 3,169,121 | 2/1965 | Goldberg | 528/191 |
| 3,334,154 | 8/1967 | Kim | 528/191 |
| 3,707,397 | 12/1972 | Gagnon | 428/412 |
| 3,708,225 | 1/1973 | Misch et al. | 428/447 |
| 3,759,807 | 9/1973 | Osborn et al. | 204/159.18 |
| 3,968,305 | 7/1976 | Oshima | 428/412 |
| 3,968,309 | 7/1976 | Matson et al. | 428/500 |
| 3,976,497 | 10/1976 | Clark | 428/447 |
| 3,986,997 | 10/1976 | Clark | 528/10 |
| 4,181,752 | 1/1980 | Martens et al. | 204/159.14 |
| 4,188,455 | 2/1980 | Howard | 204/159.19 |
| 4,198,465 | 4/1980 | Moore et al. | 428/409 |
| 4,235,954 | 11/1980 | Humphrey | 204/159.13 |
| 4,348,462 | 9/1982 | Chung | 204/159.12 |

OTHER PUBLICATIONS

Encyclopedia of Polymer Science and Technology, vol. 13, Oct. 1971, pp. 477–486.

Kirk-Othmer Encyclopedia of Chemical Technology 2nd Ed., vol. 19, pp.507–593.

Primary Examiner—Theodore Morris

[57] ABSTRACT

A process of coating a solid substrate with an abrasion resistant silicone hard coating composition which is curable upon exposure to ultraviolet radiation under a non-inert atmosphere, such as air, is provided. The coating composition is comprised of a combination of UV light crosslinkable polyfunctional acrylate monomers, $SiO_2$ in the form of colloidal silica, and acryloxy functional silanes and a selected blend of ketone-type and hindered amine-type photoinitiators.

23 Claims, No Drawings

PROCESS OF COATING A SUBSTRATE WITH AN ABRASION RESISTANT ULTRAVIOLET CURABLE COMPOSITION

This application is a continuation of application Ser No. 217,719, filed 12/18/80, now abandoned.

FIELD OF THE INVENTION

This invention relates to phot0curable hard coating compositions, and articles coated with such compositions. These coatings are comprised of the photoreaction products of acryloxy functional silanes and certain multifunctional acrylate ester monomers or mixtures thereof in combination with colloidal silica and which are catalyzed with a blend of photoinitiators comprised of photosensitive ketones and certain hindered amines, which are effective for crosslinking the coating composition upon exposure to ultraviolet radiation. The process of the present invention specifically does not require an inert atmosphere such as nitrogen and may in fact be carried out in air.

More particularly, this invention relates to an article having a photocured acrylic-siloxane coating thereon which is mar, abrasion, and solvent resistant, has good adhesion to the substrate, and is compatible with the substrate i.e., does not adversely affect the substrate by stress cracking and crazing, nor by causing crack propagation into the substrate as a result of brittleness of the coating itself, nor by adversely affecting the properties of the substrate generally such as, for example, impact resistance, elongation, and tensile strength.

BACKGROUND OF THE INVENTION

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and ordinary weathering. Continuous scratching and marring results in impaired visibility and poor aesthetics, and often requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated. Acrylics, such as polymethylmethacrylate, are also widely used transparent plastics for glazing.

Attempts have been made to improve the abrasion-resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

In copending U.S. application Ser. No. 964,910, now abandoned, coating compositions having improved resistance to moisture and humidity and ultraviolet light are disclosed. It was discovered therein that, in direct contrast to the teachings of U.S. Pat. No. 3,986,997, compositions having a basic pH, i.e., 7.1-7.8, do not immediately gel but in fact provide excellent abrasion-resistant coatings on solid substrates.

The present invention offers a significant advantage over many of the heretofore known coating compositions in that it does not require heat in order to initiate the cure reaction. The radiation cure system of the present invention expends considerably less thermal energy than conventional heat cure systems.

In copending application Ser. No. 129,297, the present applicant has disclosed a radiation curable hardcoating composition which requires the use of the acid hydrolysis product of an alkoxy functional silane. In another copending application, Ser. No. 167,622, now U.S. Pat. No. 4,348,462, the present applicant has provided a different radiation curable hardcoating composition which requires the combination of colloidal silica, acryloxy or glycidoxy functional silanes and non-silyl acrylates. However, applicant's disclosure in Ser. No. 167,622 was a precursor of the present invention. The early coating composition required an inert blanketing atmosphere in order to effectuate a proper cure. Ordinarily, free-radical type crosslinking mechanisms are retarded in non-inert atmospheres. Applicant's present invention, however, provides for the use of certain ketone-type and hindered amine photoinitiators which enable the cure of highly abrasion resistant coatings which are acryloxy-siloxane based.

In fact, the present applicant has recently demonstrated the utility of such a UV sensitive, non-inert atmosphere curable photoinitiator system in his copending application, Ser. No. 204,146 filed Nov. 5, 1980, now abandoned for a non-siloxane coating composition. The coating compositions of Ser. No. 204,146 are specific improvements over the coatings and articles disclosed in U.S. Pat. No. 4,198,465 (Moore et al.) both of which are hereby incorporated by reference. The Moore et al. disclosure teaches that certain very useful coatings and coated articles can be provided through the photoreaction of certain polyfunctional acrylate monomers and resorcinol monobenzoate. The Moore et al. coatings use any of several well known UV radiation photosensitizers including ketones such as benzophenone. The Moore et al. disclosure, however, failed to recognize that the improved coatings of the present invention could be provided by combining the ketone-type photoinitiator with a hindered amine-type compound whereupon the photosensitized acrylate-siloxane coating composition could be cured without the necessity of using resorcinol monobenzoate and without the necessity of an inert atmosphere (both of which are required by the Moore et al. disclosure). The savings and convenience provided by the use of a non-inert atmosphere such as air can be substantial, and these savings can be provided by the present invention without derogating the quality of the hard coating composition or coated product.

Since ultraviolet light is one of the most widely used types of radiation because of its relatively low cost, ease of maintenance, and low potential hazard to industrial users, rapid photo-induced polymerizations utilizing UV light rather than thermal energy for the curing of hard coatings offer several other significant advantages. First, faster curing coatings offer substantial economic benefits. Furthermore, heat sensitive materials can be safely coated and cured with UV light without the use of thermal energy which could damage the substrate. Additionally, the essentially solvent free media reduces the necessity for expensive and time consuming pollution abatement procedures.

Thus the advantages provided by the materials of the present invention are particularly useful for a number of purposes. For example, polycarbonates are commercially important materials possessing excellent physical and chemical properties which are useful in a wide range of applications from non-opaque impact resistant sheets to shaped articles. Generally, however, polycarbonates have rather low scratch resistance and are somewhat susceptible to attack by many common solvents and chemicals.

Previous efforts to overcome this low scratch resistance and susceptibility to attack by solvents have included lamination procedures and applications onto the polycarbonate of a surface coating. Many of these prior art remedial efforts have been unsuccessful due to the incompatibility of the laminate and coating materials with the polycarbonate substrate. This incompatibility has resulted in stress cracking and crazing of the polycarbonate, crack propagation into the polycarbonate as a result of the brittleness of the coating, and a reduction of other advantageous properties of the polycarbonate.

The prior art coatings for polycarbonates have included organopolysiloxanes, U.S. Pat. No. 3,707,397; polyester-melamines or acrylic-melamines, U.S. Pat. No. 3,843,390; and allyl resins, U.S. Pat. No. 2,332,461. These types of prior art coatings are generally applied from solutions of inert solvents and are cured to final properties by baking at elevated temperatures. The disadvantages of such systems are obvious. The heat curing requires a supply of thermal energy thereby adding to the cost of the system. Further, the thermal curing step is somewhat limited by the heat distortion temperature of the polycarbonate which is to be coated. Thus, in coating of polycarbonates, sheets of 30 mils and less generally cannot be coated and cured economically because of excessive warpage of the sheets during the thermal curing process.

U.S. Pat. No. 3,968,305 describes a synthetic shaped article having a mar-resistant polymer surface layer integrated with the polymer surface body, said polymer surface layer consisting essentially of, in polymerized form, (a) 20 to 100 weight percent of compound having a total of at least three acryloxy and/or methacryloxy groups linked with a straight chain aliphatic hydrocarbon residue having not more than 20 carbon atoms, and (b) 0 to 80 weight percent of at least one copolymerizable mono- or diethylenically unsaturated compound. This type of a surface layer suffers from the fact that it generally has poor durability of adhesion after prolonged exposure to weathering.

U.S. Pat. No. 3,968,309 describes a molded article of plastic having on its surface a cured film of a coating material comprising at least 30% by weight of at least one polyfunctional compound selected from the group consisting of polymethacryloxy compounds having a molecular weight of 250 to 800 and containing at least three methacryloyloxy groups in the molecule and polyacryloyloxy compounds having a molecular weight of 250 to 800 and containing at least three acryloxy groups in the molecule. This patent, however, also teaches that this coating must contain from 0.01 to 5% by weight of a fluorine-containing surfactant in order for the coated article to be acceptable. This patent teaches that when the coating material contains less than 0.01% by weight of the fluorine-containing surfactant, it is impossible to obtain a coated article having the requisite degree of surface hardness, surface smoothness, abrasion resistance and optical clarity. If the coating material contains more than 5% by weight of said fluorine-containing surfactant, the adhesion between a cured film of the coating material and a molded substrate of plastic is unsatisfactory.

It has now been found that a coating composition containing colloidal silica and acryloxy functional alkoxysilanes as well as certain specific polyfunctional acrylic monomers in combination with a blend of ketone and hindered amine photoinitiators provides excellent and durable UV cured coatings, especially for high strength plastic substrates such as polycarbonate, polyester, polymethylmethacrylate, and other polyacrylates, as well as polyamides, nylon and metalized plastic surfaces. These materials may be in films or sheets as well as in the form of molded parts. Thus, the present invention provides certain acrylate-siloxane based UV-cured coatings which adhere tenaciously and durably to the substrate, are compatible with the substrate, are mar, abrasion and solvent resistant, and maintain properties after prolonged exposure to weathering.

It is therefore an object of the present invention to provide ultraviolet light curable coating compositions providing improved mar and abrasion resistance which are curable under a non-inert atmosphere such as air.

It is another object to provide a UV curable coating comprising the photoreaction products of colloidal silica and acryloxy functional silanes in combination with certain polyfunctional acrylate monomers and a blend of ketone-type and hindered amine-type photoinitiators.

It is another object to provide a process for providing abrasion resistant ultraviolet light curable coating compositions which are curable on rigid and flexible substrates, and which do not require an inert atmosphere for proper curing thereon.

It is still another object to provide articles of manufacture which are highly mar and abrasion resistant by virtue of having been coated with the coatings of the present invention which have been cured thereon.

SUMMARY OF THE INVENTION

The present invention provides an abrasion resistant, durably adhered, ultraviolet light curable silicone hardcoating composition which is curable in a non-inert atmosphere, and which comprises:

(A) at least one ultraviolet light curable (i.e. crosslinkable) polyfunctional acrylate monomer represented by the general formula $$(H_2C=CR'—COO)_n—R$$

wherein n is an integer having a value of from 1 to 4, and R is selected from the group consisting of n valent aliphatic hydrocarbon residue, n valent aliphatic hydrocarbon residue containing at least one ether linkage, and n valent substituted hydrocarbon residue containing at least one ether linkage, and R' is hydrogen or a lower alkyl radical such as methyl, (B) $SiO_2$ in the form of colloidal silica; and (C) at least one acryloxy functional silane and especially alkoxy silanes which are acryloxy functional and which have the general formula

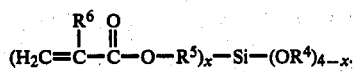

wherein $R^4$ is a monovalent hydrocarbon radical, $R^5$ is a divalent hydrocarbon radical, $R^6$ is selected from the group consisting of hydrogen atoms and monovalent hydrocarbon radicals and x is an integer of from 1 to 4 inclusive.

The coating composition is catalyzed by adding to these ingredients a blend (D) of photoinitiators which have been discovered effective for crosslinking the composition to form the hard coatings of the present invention, upon exposure to ultraviolet radiation and without the necessity of an inert (e.g. $N_2$) blanketing atmosphere. As will be described below, numerous optional ingredients can be added to the hardcoating compositions falling within the scope of the present invention.

DESCRIPTION OF THE INVENTION

In accordance with the present invention there may be provided a non-opaque, more specifically, a transparent, article having deposited on the surface thereof an adherent, mar, abrasion and chemical resistant nonopaque coating, said coating containing the photoreaction products of at least one UV curable polyfunctional acrylate monomer, colloidal silica, acryloxy functional alkoxy silanes and a blend of ketone and amine type photoinitiators as will be described below. The coating is obtained through the UV cure of (i) an acrylate-siloxane based coating composition, and (ii) the selected photoinitiator blend, under a non-inert atmosphere. An anti-weathering agent such as resorcinol monobenzoate may be included if optionally desired.

To exemplify the practice of this invention, any of the aromatic polycarbonates can be employed to provide suitable substrates to be coated. These are homopolymers and copolymers and mixtures thereof that are prepared by reacting a dihydric phenol with a carbonate precursor. Typical of some of the dihydric phenols that may be employed in the practice of this invention are bisphenol-A (2,2-bis(4-hydroxyphenyl)propane), bis(4-hydroxyphenyl)methane,
2,2-bis(4-hydroxy-3-methylphenyl) propane,
3,3-bis(4-hydroxyphenyl)pentane,
2,2-bis(3,5-dichloro-4-hydroxyphenyl)-propane,
2,2-bis(4-3,5-dibromo-4-hydroxyphenyl) propane, and bis(3-chloro-4-hydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer substrate.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymer substrates for the coating compositions of this invention may be prepared by employing a molecular weight regulator, an acid acceptor and a catalyst. The molecular weight regulators which can be employed in carrying out the process of this invention include monohydric phenols such as phenol, chroman-I, para-tertiarybutyl-phenol, para-bromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed to provide a suitable polycarbonate substrate can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetramethyl ammonium chloride, tetramethyl ammonium hydroxide, tetra-n-butyl-ammonium iodide, benzyltrimethylammonium chloride and quaternary phosphonium compounds such as, for example, n-butyl-triphenyl phosphonium bromide and methyltriphenyl phosphonium bromide.

Also included therein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, or haloformyl groups or mixtures thereof. Examples of these polyfunctional aromatic compounds which may be employed include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also included herein are blends of a linear polycarbonate and a branched polycarbonate.

It is to be understood that the utility of the coating compositions of the present invention is not limited to the polycarbonates described above. There are numerous other classes of substrates which may be suitably rendered mar and abrasion resistant by the coatings and processes disclosed herein. Among these other substrates are such sheet, film and molded substrates as polyester and polymethylmethacrylate and other high strength films such as polyacrylates, polyamides, nylon and plastic surfaces which have been metalized by such techniques as sputtering, electroplating and vapor deposition. Metal surfaces such as aluminum may also be coated.

Acrylic silanes useful in the compositions and processes of the present invention include those having the general formula:

$$(H_2C=\overset{R^6}{\underset{|}{C}}-\overset{O}{\underset{\|}{C}}-O-R^5)_x-Si-(OR^4)_{4-x}.$$

wherein $R^4$ is a monovalent hydrocarbon radical such as methyl or ethyl radicals, $R^5$ is a divalent hydrocarbon radical, and preferably has from 1 to 6 carbon atoms such as divalent methyl, ethyl, propyl, and butyl etc. radicals, $R^6$ is either a hydrogen atom or a monovalent hydrocarbon radical such as methyl, x is an integer from 1 to 4 but will ordinarily be 1. Examples of suitable acrylic silanes are those trialkoxy silanes having the formulas:

$CH_2=CCH_3CO_2-CH_2CH_2-Si(OCH_3)_3$ $CH_2=CHCO_2-CH_2CH_2-Si(OCH_3)_3$ $CH_2=CCH_3CO_2-CH_2CH_2-Si(OCH_2CH_3)_3$ $CH_2=CHCO_2-CH_2CH_2-Si(OCH_2CH_3)_3$ $CH_2=CCH_3CO_2-CH_2CH_2CH_2-Si(OCH_3)_3$ $CH_2=CHCO_2-CH_2CH_2CH_2-Si(OCH_3)_3$ $CH_2=CCH_3CO_2-CH_2CH_2CH_2-Si(OCH_2\ CH_3)_3$ $CH_2=CHCO_2-CH_2CH_2CH_2-Si(OCH_2CH_3)_3$ $CH_2=CCH_3CO_2-CH_2CH_2CH_2CH_2-Si(OCH_3)_3$ $CH_2=CHCO_2-CH_2CH_2CH_2CH_213\ Si(OCH_3)_3$ $CH_2=CCH_3CO_2-CH_2CH_2CH_2CH_2-Si(OCH_2CH_3)_3$ $CH_2=CHCO_2-CH_2CH_2CH_2CH_2-Si(OCH_2CH_3)_3$

Another of the necessary ingredients of the hardcoating composition of the present invention is colloidal silica. Colloidal silica is a dispersion of submicron-sized silica ($SiO_2$) particles in an aqueous or other solvent medium. Colloidal silica is useful in hardcoating compositions since the $SiO_2$ reacts with the various alkoxysilane constituents to form a polysiloxane framework for the coating. It is this polysiloxane backbone which provides the hardcoat composition with many of the advantages inherent in silicone products such as a wide-ranging resistance to environmental extremes.

Dispersions of colloidal silica are available from a number of chemical manufacturers such as DuPont, Rohm and Haas and Nalco Chemical Company. Colloidal silica is available in either acidic or basic form, however, for purposes of the present invention it is preferable that the acidic form be utilized. The inventor of the present coating compositions has found that superior properties are achieved with acidic colloidal silica (i.e. dispersions with low sodium content) and has found the acidic forms to be easy to work with.

An example of a satisfactory colloidal silica for use in these coating compositions is Nalcoag 1034A, available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34 percent by weight. In the examples given below the weight in grams or parts by weight of the colloidal silica includes its aqueous medium. Thus, for example, 520 grams of Nalcoag 1034A colloidal silica represents, approximately, 177 grams of $SiO_2$ by weight.

It should be noted, however, that the aqueous medium is utilized as a convenient way of handling the colloidal silica and does not form a necessary part of the hardcoating compositions of the present invention. In fact it is to be emphasized that these coating compositions find particularly beneficial utility in the fact that they may be a part of a solventless system.

It will be appreciated that those skilled in the art will recognize the expression "colloidal silica" as representing a broad range of silica-suspensions which should not necessarily be limited to a classical definition of colloid such e.g. particles which lie in the range from one millimicron to one micron. The term colloidal silica, therefore, is intended to represent a wide variety of finely divided $SiO_2$ forms which can be utilized to form the hardcoating compositions of the present invention without the necessity of undue experimentation.

Polyfunctional acrylate ester monomers are another of the basic ingredients used in the coating composition of the present invention and are represented by the general formula $$\left( H_2C=\underset{\underset{R'}{|}}{C}-\overset{O}{\underset{\|}{C}}-O \right)_n R \qquad (I)$$

wherein n is an integer from 1 to 4, and more preferably from 1 to 2; and R is a n functional hydrocarbon residue, a n functional substituted hydrocarbon residue, a n functional hydrocarbon residue containing at least one ether linkage, and a n functional substituted hydrocarbon residue containing at least one ether linkage, and R' is hydrogen or a lower alkyl radical such as methyl.

Preferred n functional hydrocarbon residues are the n functional aliphatic, preferably saturated aliphatic, hydrocarbon residues containing from 1 to about 20 carbon atoms and the n functional aromatic hydrocarbon residues containing from 6 to about 10 carbon atoms.

Preferred n functional hydrocarbon residues containing at least one ether linkage are the n functional aliphatic hydrocarbon residues, preferably saturated aliphatic hydrocarbon residues, containing from 1 to about 5 ether linkages and from 2 to about 20 carbon atoms.

Preferred n functional substituted hydrocarbon residues are the n functional aliphatic hydrocarbon residues, preferably the saturated aliphatic hydrocarbon residues, containing from 1 to about 20 carbon atoms, and the n functional aromatic hydrocarbon residues containing from 6 to about 10 carbon atoms which contain substituent groups such as the halogens, i.e., fluorine, chlorine, bromine, and iodine, hydroxyl, —COOH, and 13 COOR' groups wherein R' represents alkyl groups containing from 1 to about 6 carbon atoms.

Preferred n functional substituted hydrocarbon residues containing at least one ether linkage are the n functional aliphatic, preferably saturated aliphatic, hydrocarbon residues containing from 2 to about 20 carbon atoms and from 1 to about 5 ether linkages which contain substituent groups such as the halogen hydroxyl, —COOH, and —COOR' groups wherein R' is as defined above. It is to be understood that where substituent groups are present, they should be such that they do not unduly hinder or interfere with the photocure of the polyfunctional acrylic monomers. The more preferred polyfunctional acrylic monomers are those represented by formula I wherein R is selected from the group consisting of an n functional saturated aliphatic hydrocarbon residue containing from 1 to about 20 carbon atoms, a hydroxyl substituted n functional saturated aliphatic hydrocarbon residue containing from 1 to about 20 carbon atoms, an n functional saturated aliphatic hydrocarbon residue containing from 2 to about 20 carbon atoms and from 1 to about 5 ether linkages, and a hydroxyl substituted n functional saturated aliphatic hydrocarbon residue containing from 2 to about 20 carbon atoms and from 1 to about 5 ether linkages.

The preferred polyfunctional acrylate ester monomers are those wherein R is an n functional saturated aliphatic hydrocarbon, ether, or polyether radical, with those monomers wherein R is an n valent saturated aliphatic hydrocarbon radical being more preferred.

More particularly, the difunctional acrylic monomers, or diacrylates, are represented by formula I wherein n is 2; the trifunctional acrylic monomers, or triacrylates, are represented by formula I wherein n is 3; and the tetra-functional acrylic monomers, or tetraacrylates, are represented by formula I wherein n is 4. Illustrative of suitable polyfunctional acrylate ester monomers of formula I are those listed below in Table I.

TABLE I $CH_2=CHCO_2-CH_2-OCOCH=CH_2$ $CH_2=CHCO_2-CH_2CH_2-OCOCH=CH_2$ $CH_2=CH-CO_2-CH_2CHOHCH_2-OCOCH=CH_2$ $CH_{CHCCH3}CO_2-CH_2CHOHCH_2-OCOCCH_3=CH_2$ $CH_2=CHCO_2-CH_2CH_2-O-CH_2CH_2-OCOCH=CH_2$ $CH_2=CH_2CO_2-CH_2CH_2-O-CH_2CH_2-O-CH_2CH_2-OCOCH=CH_2$ $CH_2=CCH_3CO_2-CH_2CH_2-O-CH_2CH_2-O-CH_2CH_2-OCOCCH_3=CH_2$ $CH_2=CHCO_2-CH_2CH_2-O-CH_2CH_2-O-CH_2CH_2-O-CH_2CH_2-OCOCH=CH_2$ $CH_2=CCH_3CO_2-CH_2CH_2-O-CH_2CH_2-O-CH_2CH_2-O-COCCH_3=CH_2$ $CH_2=CHCO_2-CH_2CH_2CH_2-OCOCH=CH_2$ $CH_2=CHCO_2-CH_2CH_2CH_2CH_2-OCOCH=CH_2$ $CH_2=CHCO_2-CH_2CH_2CH_2CH_2CH_2-OCOCH=CH_2$ $CH_2=CHCO_2-CH_2CH_2CH_2CH_2CH_2CH_2-OCOCH=CH_2$ $CH_2=CHCO_2-CH_2CH_2-CHCH_3-OCOCH=CH_2$ $CH_2=CHCO_2-CH_2C(CH_3)_2-CH_2-OCOCH=CH_2$ $CH_2=CCH_3CO_2-CH_2-OCOCCH_3=CH_2$ $CH_2=CCH_3CO_2-CH_2CH_2-OCOCCH_3=CH_2$ $CH_2=CCH_3CO_2-CH_2CH_2-O-CH_2CH-OCOCCH_3=CH_2$ $CH_2=CCH_3CO_2-CH_2CH_2CH_2-OCOCCH_3=CH_2$ $CH_2=CCH_3CO_2-CH_2CH_2CH_2CH_2-OCOCCH_3=CH_2$ $CH_2=CCH_3CO_2-CH_2CH_2CH_2CH_2CH_2-OCOCCH_3=CH_2$ $CH_2=CCH_3CO_2-CH_2CH_2CH_2CH_2CH_2CH_2-OCOCCH_3=CH_2$ $CH_2=CCH_3CO_2-CH_2CH_2-CHCH_3-OCOCCH_3=CH_2$ $CH_2=CCH_3CO_2-CH_2C(CH_3)_2CH_2-O-COCCH_3=CH_2$

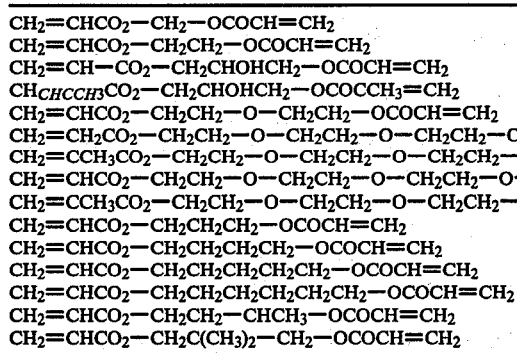

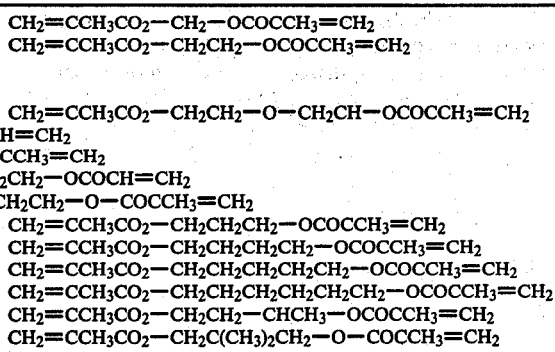

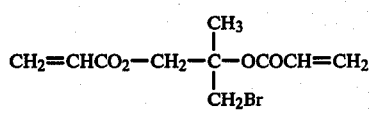

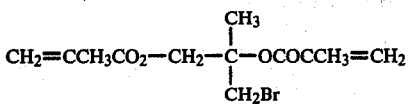

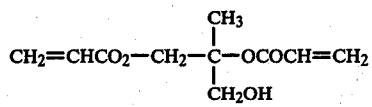

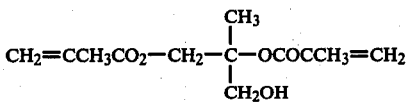

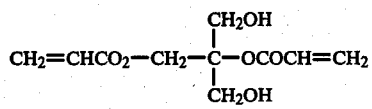

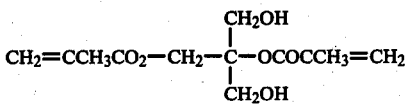

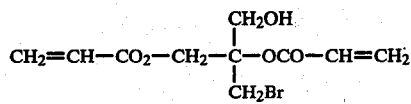

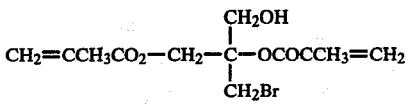

$CH_2=CHCO_2-CH_2-CH=CH-CH_2-CH_2-OCOCH=CH_2$   $CH_2=CCH_3CO_2-CH_2-CH=CH-CH_2CH_2-OCOCH=CH_2$

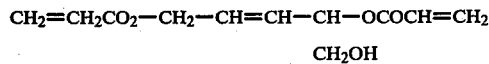

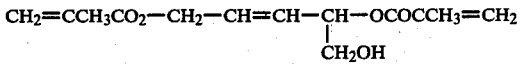

$CH_2=CHCO_2-CH_2CHOCH_3CH_2-OCOCH=CH_2$   $CH_2=CCH_3CO_2-CH_2CHOCH_3CH_2-OCOCCH_3=CH_2$

TABLE I-continued
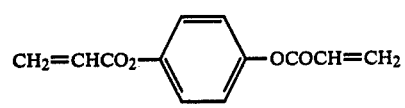 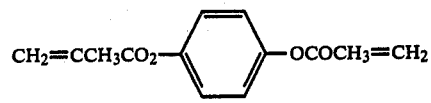
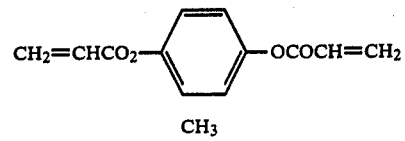 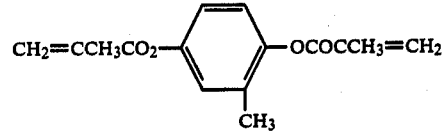
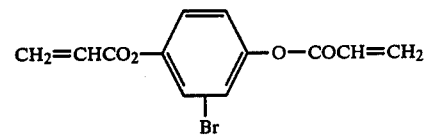 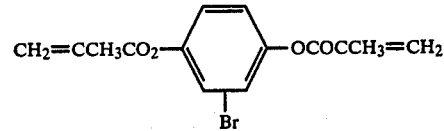
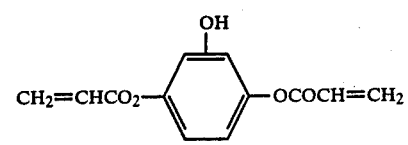 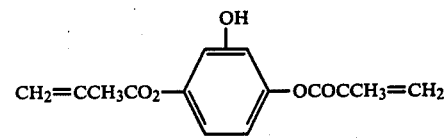
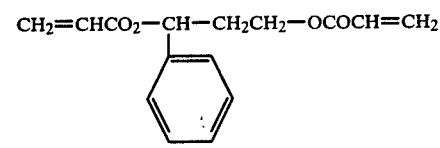 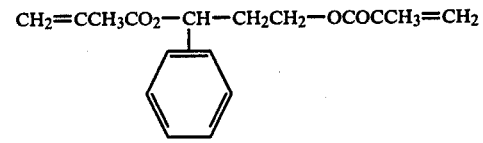
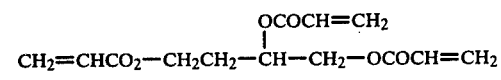 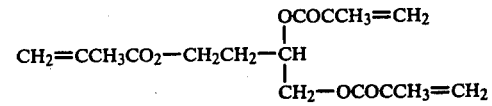
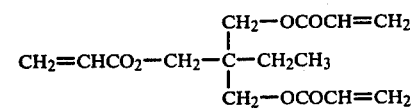 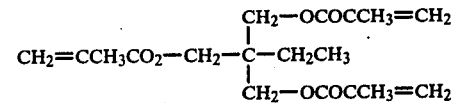
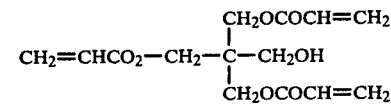 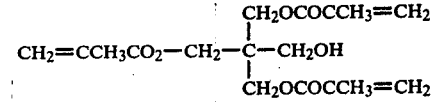
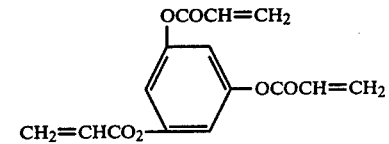 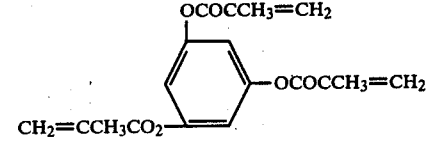
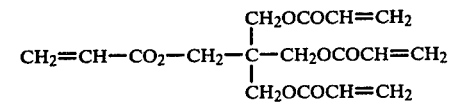 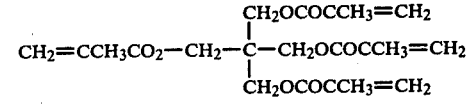
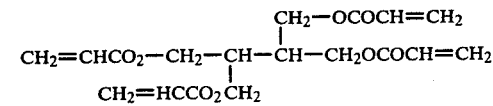 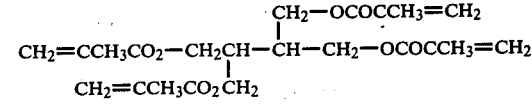
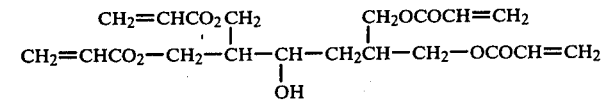

TABLE I-continued

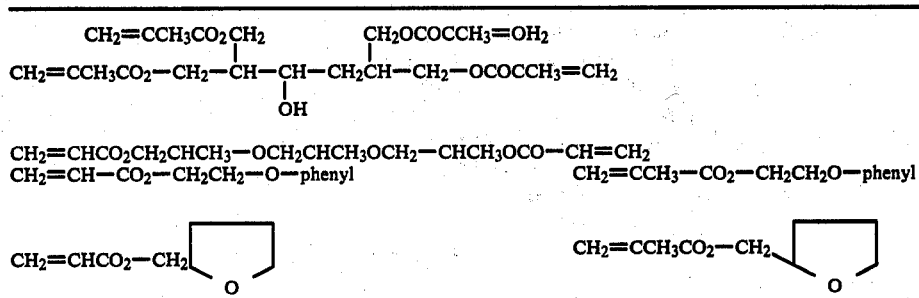

These polyacrylate esters and their production are well known to those skilled in the art. One method of producing the di-, tri-, and tetraacrylate esters involves reacting acrylic acid with a di, tri-, or tetrahydroxyl compound to produce the diester, triester or tetraester. Thus, for example, acrylic acid can be reacted with ethylene glycol to produce ethylene glycol diacrylate.

Although the coating compositions may contain only one of said polyfunctional acrylate monomers, preferred coating compositions contain a mixture of two polyfunctional monomers, preferably a diacrylate and a triacrylate. When the coating compositions contain a mixture of acrylate monomers, it is preferred that the ratio, by weight, of the diacrylate to the triacrylate be from about 30/70 to about 70/30. Exemplary mixtures of diacrylates and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

While the corresponding coatings may likewise contain the ultraviolet light reaction product of a single polyfunctional acrylate monomer, coatings containing the photoreaction product of two polyfunctional acrylate monomers, preferably a diacrylate and a triacrylate, are preferred.

Generally, the coating composition will contain, approximately, 15 to 95 weight percent of polyfunctional acrylate or mixture of acrylates, 5 to 85 weight percent of the colloidal silica (measured with respect to its silica content plus aqueous medium) and 5 to 95 weight percent of the acrloxy functional alkoxy silane.

The photocurable coating compositions also contain a photosensitizing amount of photosensitizer, i.e., an amount effective to effect the photocure of the coating composition. Generally, this amount is from about 0.01% to about 10% by weight, and preferably from about 0.1% to about 5% by weight of the photocurable coating composition.

It has been discovered that certain blends of ketone-type and hindered amine type materials are photoinitiators which are effective for crosslinking the above described coating compositions to form suitable hard coatings upon exposure to UV radiation. It is preferred that the ratio, by weight, of the ketone compound to the hindered amine compound be from, approximately, 80/20 to 20/80. Ordinarily, 50/50 or 60/40 mixtures are quite satisfactory.

Among the particularly preferred ketone-type compounds are those selected from the group consisting of:
benzophenone, and other acetophenones,
benzil, benazldehyde and o-chlorobenzaldehyde,
xanthone,
thioxanthone,
2-chlorothioxanthone,
9, 10-phenanthrenequinone,
9, 10-anthraquinone,
ethylbenzoin ether,
isopropyl benzoin ether,
a, a-diethoxyacetophenone,
1-phenyl-1, 2-propanediol-2-o-benzoyl oxime, and
a,a, - dimethoxy-a-phenylacetophenone.

In the above formulas, lower case a represents configurations of radicals in the alpha position.

Among the particularly preferred hindered amine-type compounds are those selected from the group consisting of:
methyldiethanol amine,
ethyldiethanol amine,
dimethylethanol amine,
diethyl ethanol amine,
triethanol amine,
dimethyl amino ethylbenzoate,
ethyl-3-dimethyl amino benzoate,
4-dimethyl amino benzophenone,
4-diethyl amino benzophenone,
4, 4'-bis (diethylamino) benzophenone,
4, 4'-bis (dimethylamino) benzophenone,
N, N-diethyl aniline,
phenyl methyl ethanol amine,
phenyl ethyl ethanol amine,
phenyl diethanol amine, and
N,N,N',N'-tetramethyl-1,3-butanediamine.

The coating compositions of the instant invention may also optionally contain resorcinol monobenzoate. The resorcinol monobenzoate is present in an amount, based upon the weight of the coating composition, exclusive of any additional solvent which may optionally be present, of from about 1 to about 20 weight percent, preferably from about 3 to about 15 weight percent. The UV cured coating contains from about 1 to about 20% by weight of the photoreaction products of resorcinol monobenzoate, which products are formed during the UV cure of the UV curable coating composition if the resorcinol monobenzoate is utilized.

The coating compositions of the instant invention may also optionally contain various flatting agents, surface active agents, thixotropic agents, UV light absorbers and dyes. All of these additives and the use thereof are well known in the art and do not require extensive discussions. Therefore, only a limited number will be referred to, it being understood that any of these compounds can be used so long as they do not deleteriously affect the photocuring of the coating compositions and do not adversely affect the non-opaque character of the coating.

The various surface-active agents, including anionic, cationic and nonionic surface-active agents are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference.

In the practice of the present invention, the photocurable coating compositions are first compounded by adding together the colloidal silica, the acryloxy functional alkoxy silane, the polyfunctional acrylic monomer or mixtures thereof, the UV photosensitizer blend, and, optionally, any of the other aforementioned additives. Additionally, if so desired to reduce the viscosity of the coating formulation, an organic solvent, such as an alcohol, may optionally be incorporated into the formulation. Generally, the amount of solvent if any, present should be such that evaporation of the solvent occurs before any deleterious effect on the substrate. The various components are thoroughly mixed so as to form a generally homogeneous coating composition. A thin, uniform coating of the coating solution is then applied onto the substrate by any of the known means such as dipping, spraying, rollcoating and the like. The coating is then cured in a non-inert, e.g., air, atmosphere, by UV irradiation which can have a wavelength of from 1849 A. to 4000 A. The lamp systems used to generate such UV radiation can consist of discharge lamps, as for example, xenon, metallic halide, metallic arc, such as low or high pressure mercury vapor discharge lamp, etc., having operating pressures of from as low as a few milli-torr up to about 10 atmospheres. By curing is meant both polymerization of the polyfunctional acrylic monomers and cross-linking of the polymers to form hard, non-tacky coatings.

As stated above, the hardcoating compositions of the present invention are silicone-based due to the condensation of colloidal silica and the various hydrolyzable silanes. Those skilled in the art will recognize the relative weight percent of the silicone can be varied in proportion with the remaining hardcoating composition ingredients. The silicone content can be adjusted by varying the relative amounts of the constituent components. This adjustment in silicone content will in turn influence the physical properties of the hardcoat. For example, the percent silicone content is inversely related to the $\Delta$ % H. That is to say, as the content of silicone becomes a greater percentage of the total hardcoat composition, the value of $\Delta$ % H will decrease for that particular hardcoat. It will be recognized that such lower values of $\Delta$ % H indicate improved abrasion resistance for those hardcoats.

Another property which is related to the silicone content is the value of QUV which is a measure of the anti-weathering capabilities of the hardcoat. Hardcoat compositions exhibiting relatively greater QUV values are those which possess greater resistance to harsh environmental conditions such as prolonged exposure to ambient ultraviolet radiation which can cause deliterious effects on an unprotected substrate. It has been found that hardcoating compositions which contact a large proportion of silicone have a relatively lower QUV value than low silicone hardcoats. However, as stated above, the lower silicone content causes unsatisfactory abrasion resistance. Thus, one practicing this invention has the option of adjusting the properties of his coating composition in order to achieve optimum properties for a given application.

Another property of these compositions which can be influenced by the silicone content is the viscosity of the uncured coating composition. As a general rule, the viscosity of the composition will become greater as the silicone content increases. Those skilled in the art will recognize that the viscosity of the composition is adjusted to influence the coating properties of the material.

PREFERRED EMBODIMENT OF THE INVENTION

In order to more fully and clearly describe the present invention, it is intended that the examples be considered as illustrative rather than limiting the invention disclosed and claimed herein. All parts are by weight.

EXAMPLE 1

An aromatic polycarbonate can be prepared by reacting 2,2-bis(4-hydroxyphenyl) propane and phosgene in the presence of an acid acceptor and a molecular weight regulator. The product is then fed to an extruder, which extruder is operated at about 265° C. and the extrudate is comminuted into pellets.

The pellets are then injection molded at about 315° C. into test panels which are subjected to an abrasion test, and an adhesion test. In the following examples, the test panels were 6 inch by 8 inch plaques cut from one-eighth inch and one-quarter inch thick Lexan ® coating blanks, which are available from the General Electric Company.

The abrasion test is one wherein test panels having a 17/64th inch diameter hole cut in the center are subjected to a Taber Abraser. The Taber Abraser is equipped with CS-10F wheels which are resurfaced every 500 cycles by abrading for 25 cycles on a S-111 refacing disc. The weights used in combination with the CS-10F wheels are 500 gm weights. Initial measurements of % Haze are made at four places around the future wear track of the sample using a Gardner Hazemeter. The sample is abraded for a specified number of cycles, cleaned with warm soap and water and dried by blowing compressed air across the sample, and the % Haze is remeasured at the same four places. The four differences in % Haze are calculated and averaged to give the $\Delta$ % Haze. The $\Delta$ % Haze of this uncoated sample is generally between 45 to 50. The number of cycles in each test are specified by the number following the letter H. For example, % H500 and % H1000 each measures, respectively, the percent haze measured following 500 and 1000 cycles on the Taber Abraser.

The scribed adhesion test consists of using a multiple blade tool to cut parallel grooves through the coating and into the substrate. The test panel is then rotated 90° and the cutting process is repeated, thereby leaving a grid pattern consisting of 1 mm squares cut into the coating. An adhesive tape such as 3M's Scotch 710 is applied over the cross hatched area and quickly pulled off. A sample fails the adhesion test if any of the squares are pulled off by the tape. This test is repeated three times.

EXAMPLE 2

A mixture of 520 g. of colloidal silica (Nalcoag 1034A produced by Nalco Chemical Co., Ill.) and 80 g. of 3-methacryloxypropyltrimethoxysilane (A-174 produced by Union Carbide) was stirred for one hour at ambient temperature. After 500 g. of cellosolve were added, the solvents were removed under reduced pressure at 50° C. The thick residue is then dissolved in 32 g. of diethyleneglycoldiacrylate and 32 g. of trimethylolpropane tracrylate. The clear acrylic-silicone prepolymer was mixed with 8.5 g of benzophenone, 9.0 g. of methyldiethanol amine, 42 g. of N-Vinylpyrrolidone, and 2 g. of surface active agent produced by Mallincrodt Chemical Co. under the designation BYK-300. The cooling composition was applied to a polycarbonate Lexan panel and then passed through a PPG QC 1202 UV-processor. The speed of the conveyor was 20 ft./min. In an air atmosphere one pass through this system resulted in a coating which was clear and hard cured. The coated Lexan panel was subjected to the afore-described abrasion and scribed adhesion tests and the results are set forth in Table II. The film thickness was about 0.11 to 0.15 mils.

EXAMPLE 3

A mixture of 1040 g. of Nalcoag 1034A collodial silica, 160 g. 3-methacryloxpropyltrimethoxysilane (of A-174), and 80 g. of phenyltrimethoxy silane was stirred at ambient temperature for 45 minutes. Upon removal of water with the aid of methyl cellosolve at 50° C., the thick hydrolyzate was mixed with 64 g. of trimethylolpropane triacrylate and 64 g. of diethylene glycol diecrylate. After the addition of 16 g. of benzophenone, 16 g. of triethanol amine and 4 g. of BYK-300, the coating material was coated on a Lexan panel and passed through a UV-processor as in Example 2. The coated Lexan panel was subjected to the afore-described abrasion and scribed adhesion tests, and the results are set forth in Table II.

EXAMPLE 4

A mixture of 52 g. of Nalcoag 1034A colloidal silica and 10 g. of 3-methacryloxypropyltrimethoxysilane (A-174) in 80 g. of isopropanol and 80 g. of isobutanol was refluxed for 30 minutes. After the mixture was cooled to room temperature, one drop of 50% sodium hydroxide solution was added. Upon removal of solvent under reduced pressure, the thick resin was dissolved in 3.2 g of diethylene glycol diacrylate, 3.2 g. of trimethylpropanetriacrylate, and 4 g. of N-vinyl pyrrolidone. After the addition of photoinitiators, 0.8 g. of benzophenone and 0.8 g. of methyldiethanol amine, the coating composition was applied to a polycarbonate Lexan panel and passed through a UV-processor as in Example 2. The coated Lexan panel was subjected to the afore-described abrasion and scribed adhesion tests and the results are set forth in Table II.

EXAMPLE 5

A mixture of 550 g. of Nalcoag 1034A collodial silica and 100 g. of 3-methacryloxypropyltrimethoxysilane (A-174) was stirred at room temperature. Excess of water was removed with ethyl cellosolve at 50° C. The thick hydrolyzate was dissolved in 150 g. of trimethylolpropanetriacrylate and 150 g. of diethyleneglycol diacrylate. After 12 g. of benzophenone and 13 g. of methyldiethanol amine were added, the coating material was coated on a Lexan panel and passed through a UV-processor as in Example 2. The coated Lexan panel was subjected to the afore-described abrasion and scribed adhesion tests and the results are set forth in Table II.

EXAMPLE 6

A mixture of 520 g. of Nalcoag 1034A colloidal silica and 160 g. of 3-methacryloxypropyltrimethoxysilane (A-174) was stirred at room temperature for 30 minutes. After the addition of 600 g. of cellosolve and 1 g. of 50% sodium hydroxide solution water and solvents were removed under reduced pressure. The residue was taken up in 32 g. of tetra ethylene glycol diacrylate and 32 g. of trimethylolpropanetriacrylate.

After addition of 8 g. benzophenone, 8 g. of methyl diethanol amine, and 2 g. of BYK-300, the coating material was applied to a polycarbonate panel and passed through a UV processor as in Example 2. The coated panel was subjected to the afore-described abrasion and scribed adhesion tests and the results are set forth in Table II.

EXAMPLE 7

A mixture of 500 g. of Nalcoag 1034A and 90 g. of 3-methacryloxypropyltrimethoxysilane (A-174) was agitated at room temperature for 30 minutes. After the addition of 500 g. of ethyl cellosolve and 0.7 g. of 50% NaOH solution, solvents were removed under reduced pressure at 55° C. The thick residue was dissolved in 32 g. of diethyleneglycoldimethacrylate and 32 g. of trimethylolpropanetriacrylate. After 8 g. of benzophenone, 8 g. of trimethylolpropanetriacrylate, and 2 g. of BYK-300 were added. The coating material was coated on a Lexan panel and passed through a UV-processor as in Example 2. The coated panel was subjected to the afore-described abrasion and scribed adhesion tests and the results are set forth in Table II.

EXAMPLE 8

A mixture of 600 g. of Nalcoag 1034A colloidal silica and 120 g. of 3-methacryloxypropyltrimethoxysilane (A-174) was stirred at ambient temperature. 650 g. of ethyl-cellosolve and 1 g. of 50% NaOH were added. The mixture was concentrated under reduced pressure. The hydrolyate was dissolved in 120 g. of diethyleneglycoldiacrylate and 120 g. of trimethylolpropanetriacrylate. After the addition of 10 g. of benzophenone, 10 g. methyldiethanolamine, and 3 g. of BYK-300, the coating composition was applied to a Lexan panel and passed through a UV-processor as in Example 2. Table II sets forth the results of the abrasion and scribed adhesion tests.

EXAMPLE 9

A mixture of 260 g. of Nalcoag 1034A colloidal silica and 50 g. of 3-methacryloxypropyltrimethoxysilane (A-174) was stirred at room temperature for one hour. 200 g. of isopropanol and 200 g. isobutanol were added. Solvents and water were removed under reduced pressure. The thick residue was dissolved in 140 g. of diethylene glycol diacrylate, and 4.6 g. of benzophenone in 9 g. of N-vinyl pyrrolidone, 5 g. of methyldiethanolamine and 1.5 g. of BYK-300 were added. The coating composition was coated on a Lexan panel and passed through a UV-processor as in Example 2. The coated panel was subjected to the afore-described abrasion and scribed adhesion tests and the results are set forth in Table II.

EXAMPLE 10

A mixture of 520 g. of Nalcoag 1034A colloidal silica and 100 g. of 3-methacryloxypropyltrimethoxysilane (A-174) in 800 g. of isopropanol and 800 g. of isobutanol was refluxed for 30 minutes. After solvents were removed, 300 g. of trimethylolpropanetriacrylate was added to the residue, followed by 10 g. of benzophenone, and 10 g. of triethanol amine. The coating composition was applied to a Lexan panel and passed through a UV-processor as in Example 2. The coated Lexan panel is subjected to the afore-described abrasion and scribed adhesion tests and the results are set forth in Table II.

TABLE II

| EXAMPLE | ADHESION | Δ % H100 | Δ % H300 | Δ % H500 | Δ % H1000 |
|---|---|---|---|---|---|
| 2 | Pass | — | — | 4.0 | 4.6 |
| 3 | Pass | 2.4 | 3.1 | 3.8 | 4.4 |
| 4 | Pass | — | — | 3.6 | 4.2 |
| 5 | Pass | — | — | — | 6.4 |
| 6 | Pass | — | — | — | 5.1 |
| 7 | Pass | — | — | — | 6.2 |
| 8 | Pass | — | — | — | 6.5 |
| 9 | Pass | — | — | — | 5.9 |
| 10 | Pass | — | — | — | 6.1 |

The foregoing examples demonstrate that it is possible to provide air-curable silicone hardcoating compositions through the particular combination of polyfunctional acrylates, colloidal silica and acryloxy functional alkoxy silanes, and blended photoinitiators described above. These coatings and coated articles also possess such other desirable properties as optical clarity, durability of adhesion, non-degradation of the properties of the substrate, and protection of the substrate from the deliterious effects of prolonged exposure to UV.

Although specific embodiments of the invention have been described, it should not be limited to the particular compositions and articles described herein, but is intended to include all modifications that may be made which, pursuant to the patent statutes and laws, do not depart from the spirit and scope of the invention.

What is claimed as new and desired to be secured by Letters Patent of the United States is:

1. A process for providing a mar resistant tenaciously and durably adhered hard coating onto the surface of a solid substrate comprising:
I. applying a thin layer of a coating composition onto the surface of said solid substrate, said coating composition being comprised of (A) at least one polyfunctional acrylate monomer represented by the general formula

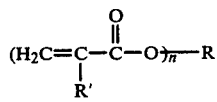

wherein n is an integer having a value of from 1 to 4, and R is selected from the group consisting of a n valent aliphatic hydrocarbon residue, a n valent substituted aliphatic hydrocarbon residue containing at least one ther linkage, and a n valent substituted aliphatic hydrocarbon residue containing at least one ether linkage, R' is selected from hydrogen or lower alkyl radicals; (B) colloidal silica; (C) at least one acryloxy functional silane of the formula

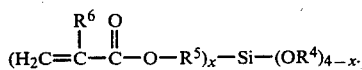

wherein $R^4$ is a monovalent hydrocarbon radical, $R^5$ is a divalent hydrocarbon radical, $R^6$ is selected from the group consisting of hydrogen atoms and monovalent hydrocarbon radicals, x is an integer of from 1 to 4 inclusive; (D) a photoinitiator comprised of a blend of (i) one or more ketones and (ii) one or more hindered amines; and
II. exposing said coated substrate under a non-inert atmosphere to ultraviolet light for a period of time sufficient to polymerize and crosslink said polyfunctional acrylate monomers, thereby forming said hard coating.

2. A process as in claim 1 wherein said non-inert atmosphere is air.

3. A process as in claim 1 wherein said solid substrate is selected from the group consisting of polycarbonate, polyester, polymethyl methacrylate, polyacrylate, polyamide, nylon, metal or metalized plastic.

4. A process as in claim 1 wherein said coating is applied in a thickness of, approximately, 0.05 to 4.0 mils.

5. A process as in claim 1 wherein said ketone is selected from the group consisting of:
benzophenone, acetophenone,
benzil, benzaldehyde, o-chlorobenzaldehyde,
xanthone,
thioxanthone,
2-chlorothioxanthone,
9, 10-phenanthrenequinone,
9, 10-anthraquinone,
ethylbenzoin ether,
isopropyl benzoin ether,
a,a-dimethoxy-a-phenylacetophenone,
a, a-diethoxyacetophenone, and
1-phenyl-1, 2-propanediol-2-o-benzoyl oxime.

6. A process as in claim 1 wherein said hindered amine is selected from the group consisting of:
methyldiethanol amine,
ethyldiethanol amine,
dimethylethanol amine,
diethylethanol amine,
triethanol amine,
dimethylamino ethylbenzoate,
ethyl-3-dimethyl amino benzoate,
4-dimethyl amino benzophenone,
4-diethyl aminobenzophenone,
4, 4'-bis(diethylamino) benzophenone,
4, 4'-bis(dimethylamino) benzophenone,
N, N-diethyl aniline,
phenyl methyl ethanol amine,
phenyl ethyl ethanol amine,
phenyl diethanol amine, and
N,N,N¹,N¹ tetramethyl - 1,3 - butanediamine 7. A process as in claim 1 wherein said photoinitiator blend is present in an amount of, approximately, 0.01 to 10 percent by weight of the ultraviolet light curable hardcoating composition.

8. A process as in claim 7 wherein said photoinitiator blend is comprised of benzophenone and methyldiethanol amine.

9. The process of claim 1 wherein said composition contains a mixture of hexanediol diacrylate and trimethylolpropane triacrylate monomers.

10. A process for providing an abrasion resistant, durably adhered, ultraviolet light curable hardcoating composition which is curable in a non-inert atmosphere comprising the steps of mixing:

(A) at least one ultraviolet light crosslinkable polyfunctional acrylate monomer represented by the general formula

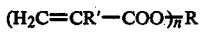

wherein n is an integer having a value of from 1 to 4, and R is selected from the group consisting of substituted and unsubstituted n valent aliphatic hydrocarbon residue, n valent aliphatic hydrocarbon residue containing at least one ether linkage, and substituted n valent aliphatic hydrocarbon residue containing at least one ether linkage, R' is selected from hydrogen or lower alkyl radicals;
(B) colloidal silica;
(C) at least one acryloxy functional silane of the formula

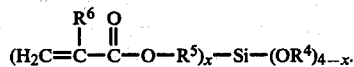

wherein $R^4$ is a monovalent hydrocarbon radical, $R^5$ is a divalent hydrocarbon radical, $R^6$ is selected from the group consisting of hydrogen atoms and monovalent hydrocarbon radicals, x is an integer of from 1 to 4 inclusive;
(D) a photoinitiator comprised of a blend of (i) one or more ketones and (ii) one or more hindered amines, wherein said photoinitiator blend is effective for cross-linking (A) upon exposure to ultraviolet radiation.

11. A process as in claim 10 further comprising the step of coating said hardcoating composition onto a solid substrate.

12. A process as in claim 11 further comprising the step of curing said hardcoating composition by exposure to an effective amount of ultraviolet radiation.

13. A process as in claim 10 wherein said ketone is selected from the group consisting of:
benzophenone, acetophenone,
benzil, benzaldehyde, o-chlorobenzoldehyde,
xanthone,
thioxanthone,
2-chlorothioxanthone,
9, 10-phenanthrenequinone,
9, 10-anthraquinone,
ethylbenzoin ether,
isopropyl benzoin ether,
a,a,-dimethoxy-a-phenylacetophenone
a, a-diethoxyacetophenone, and
1-phenyl-1, 2-propanediol-2-o-benzoyl oxime.

14. A process as in claim 10 wherein said hindered amine is selected from the group consisting of:
methyldiethanol amine,
ethyldiethanol amine,
dimethylethanol amine,
diethylethanol amine,
triethanol amine,
dimethylamino ethylbenzoate,
ethyl-3-dimethyl amino benzoate,
4-dimethyl amino benzophenone,
4-diethyl aminobenzophenone,
4, 4'-bis(diethylamino) benzophenone,
4, 4'-bis(dimethylamino) benzophenone,
N, N-diethyl aniline,
phenyl methyl ethanol amine,
phenyl ethyl ethanol amine,
phenyl diethanol amine,
$N,N,N^1,N^1$ tetramethyl - 1,3 - butanediamine 15. A process as in claim 10 further comprising the step of mixing an ultra-violet light screening agent into said hardcoating composition.

16. A process as in claim 15 wherein said screening agent is selected from esorcinol monobenzoate, resorcinol dibenzoate, methyl resorcinol monobenzoate, methyl resorcinol dibenzoate.

17. A process as in claim 10 further comprising a surface active agent.

18. A process as in claim 10 wherein said photoinitiator blend is present in an amount of, approximately, 0.01% to 10% by weight of the ultraviolet light curable hardcoating composition.

19. A process as in claim 18 wherein said photoinitiator blend is comprised of benzophenone and methyldiethanol amine.

20. A process as in claim 10 wherein said composition contains a mixture of hexanediol diacrylate and trimethylolpropane triacrylate monomers.

21. A process as in claim 10 wherein said process is carried out under a non-inert atmosphere.

22. A process as in claim 21 wherein said non-inert atmosphere is air.

23. A process as in claim 1 or 20 wherein said composition contains a mixture of diethylenglycol diocrylate and trimethylolpropane triacrylate.

* * * * *